(12) United States Patent
Sievert

(10) Patent No.: US 7,266,827 B1
(45) Date of Patent: Sep. 4, 2007

(54) EXPOSING AN APPLICATION OBJECT MODEL TO WEB-BASED CLIENTS VIA OBJECT MODEL TRAVERSAL

(75) Inventor: James A. Sievert, Lino Lakes, MN (US)

(73) Assignee: Unisys Corporation, Blue Bell, PA (US)

( * ) Notice: Subject to any disclaimer, the term of this patent is extended or adjusted under 35 U.S.C. 154(b) by 579 days.

(21) Appl. No.: 10/679,635

(22) Filed: Oct. 6, 2003

(51) Int. Cl.
*G06F 9/44* (2006.01)
*G06F 9/46* (2006.01)
*G06F 9/54* (2006.01)

(52) U.S. Cl. .................. 719/330; 719/311; 719/315

(58) Field of Classification Search .............. 719/315, 719/316, 330, 311
See application file for complete search history.

(56) References Cited

U.S. PATENT DOCUMENTS

| | | | | |
|---|---|---|---|---|
| 5,991,802 A | * | 11/1999 | Allard et al. | 709/219 |
| 6,052,710 A | * | 4/2000 | Saliba et al. | 709/203 |
| 6,782,542 B1 | * | 8/2004 | Mein et al. | 719/330 |
| 6,973,659 B2 | * | 12/2005 | Smith et al. | 719/330 |
| 7,017,162 B2 | * | 3/2006 | Smith et al. | 719/328 |
| 7,055,143 B2 | * | 5/2006 | Ringseth et al. | 717/143 |
| 2004/0128622 A1 | * | 7/2004 | Mountain et al. | 715/530 |

* cited by examiner

*Primary Examiner*—Li B. Zhen
(74) *Attorney, Agent, or Firm*—Charles A. Johnson; Richard J. Gregson; Crawford Maunu PLLC

(57) ABSTRACT

Method and apparatus for exposing an application object model to web-based clients. The various embodiments involve parsing each HTTP-form-processing request received from a client by a web server. As the property names are obtained form the HTTP-form-processing request, the objects in the object model are traversed. When the end of the HTTP-form-processing request is reached and the object model is traversed, a selected property of a referenced object is returned to the client.

20 Claims, 8 Drawing Sheets

| | 300 |
|---|---|
| Property Parsing | |
| 302 | currentObject = initialObject; // obtained from Web Config File |
| 304 | currentPropertyName = GetNextPropertyNameFromURL(); |
| 306 | while currentPropertyName != null |
| 308 |     currentType = currentObject.GetType(); |
| 310 |     // See if current type contains a property with the current property name.<br>    if currentType.GetProperties() contains currentPropertyName then |
| 312 |         currentObject = currentObject.GetProperty( currentPropertyName ); |
| 314 |     else |
| 316 |         //No property name with the current property name exists. Assume<br>        //that property name is actually the value of an indexer<br>        indexerValue = currentPropertyName; |
| 318 |         currentObject = currentObject.GetProperty( "Indexer", indexerValue ); |
| 320 |     currentPropertyName = GetNextPropertyNameFromURL(); |
| 322 | methodDescription = ParseMethodDescriptionFromURL(); |
| 324 | if methodDescription != null |
| 326 |     currentType = currentObject.GetType(); |
| 328 |     method = currentObject.GetMethod (methodDescription); |
| 330 |     currentObject = method.Invoke (currentObject, methodDescription); |
| 332 | if currentObject == null |
| 334 |     returnValue = ""; |
| 336 | else |
| 338 |     currentType = currentObject.GetType(); |
| 340 |     if (IsValueType (currentTYpe)) then |
| 342 |         returnValue = FormatValueType (currentObject); |
| 344 |     else |
| 346 |         returnValue = FormatReferenceType (currentObject); |
| 348 | response.Stream (returnValue); |

FIG. 3

EXPOSING AN APPLICATION OBJECT MODEL TO WEB-BASED CLIENTS VIA OBJECT MODEL TRAVERSAL

FIELD OF THE INVENTION

The present disclosure relates to exposing object models to Web-based clients.

BACKGROUND OF THE INVENTION

The commercialization of the Internet has greatly increased the number and variety of Web-based application programs. From information repositories to retail shopping sites to home banking, web-based application are changing the way businesses interact and the way individuals interact with business.

A Web service is an application that is a Uniform Resource Locator (URL)-addressable resource that returns information to requesting clients. A Web service may be integrated with other Web services using Internet standards. A common protocol used in implementing Web services is the Simple Object Access Protocol (SOAP), which is often implemented as Extensible Markup Language (XML) over Hypertext Transport Protocol (HTTP). With the gain in popularity of Web services, open, standards-based protocols, such as XML on HTTP, are becoming ubiquitous. Proprietary protocols, such as the Distributed Component Object Model (DCOM), may be used by only a small number of Web-based applications. Other protocols, such as the Simple Network Management Protocol (SNMP), may not be readily usable in applications and lack support for strong security models.

If a Web-based application program is implemented according to any of these protocols, both the server portion and the client portion must adhere to the protocol in order to communicate. Not only must the initial application be programmed according to the protocol, but any new clients seeking service from the server portion must also be programmed according to the protocol. Depending on the protocol, this may require installation of additional libraries of software on a prospective client system, which may be costly. Furthermore, protocols such as SNMP, DCOM, .Net Remoting, and Remote Method Invocation (RMI) either don't provide enough security or provide so much security that client cannot function in some environments.

SUMMARY OF THE INVENTION

The various embodiments of the invention provide methods and apparatus for exposing an application object model to web-based clients. Each HTTP-form-processing request received from a client by a web server is parsed for property names. As the property names are obtained form the HTTP-form-processing request, the objects in the object model are traversed. When the end of the HTTP-form-processing request is reached and the object model is traversed, a selected property of a referenced object is returned to the client.

In another embodiment, an apparatus exposes an application object model to web-based clients. The apparatus includes means for parsing each HTTP-form-processing request received from a client by a web server, and a means for traversing objects in the object model in response to property names obtained from the HTTP-form-processing request. A selected property of an object in the object model is channeled through a means for returning data from the apparatus to the client.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 3 illustrates an example of a process for parsing an input HTTP-forms-processing request in accordance with various embodiments of the invention;

DETAILED DESCRIPTION

Figure 1:
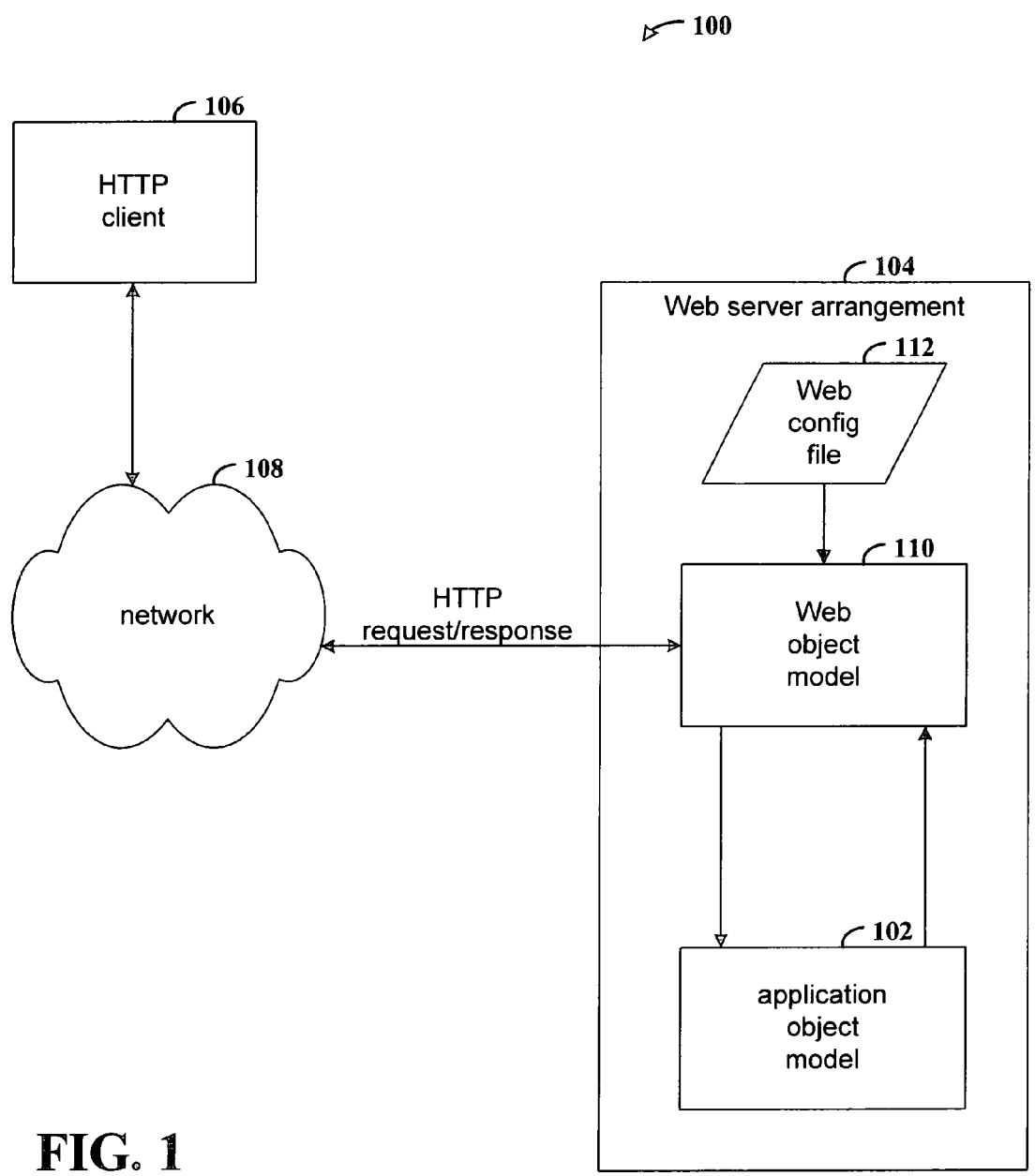
FIG. 1 is a functional block diagram that illustrates a client-server computing arrangement in accordance with various embodiments of the invention.

FIG. 1 is a functional block diagram that illustrates a client-server computing arrangement 100 in accordance with various embodiments of the invention. An object-oriented application program, including an application object model 102 to be exposed, is hosted by a web server arrangement 104. An HTTP client 106 is configured to access the functions and data provided by the application with reference to application objects defined according to application object model 102. The HTTP client and Web server arrangement 104 are coupled via a network 108 such as the Internet or an Intranet.

Access requests from the HTTP client 106 may be submitted by way of HTTP-forms-processing requests, for example, HTTP GET and POST form processing requests, addressed to the web server arrangement 104. The HTTP-forms-processing requests reference the application name, and the application includes a Web object model 110 that parses incoming HTTP-forms-processing requests for the application relative to the application objects 102. In parsing an HTTP-forms-processing request, the Web object model obtains an application name from the HTTP-forms-processing request and begins with an initial object that is associated with the application name in a Web configuration file 112. The name of the initial object is used by the Web object model as the starting point for navigating the object model.

Application object model 102 represents both the information that defines the objects, relationships, data types, and methods of the objects as well as the data objects instantiated by and to which values have been assigned by the application logic. The Web object model 110 is a set of objects installed in association with the application object model. The Web object model receives HTTP-forms-processing requests that reference the application objects and processes the requests against the application object model and associated objects.

The Web server arrangement 104 may include one or more data processing systems that are configured with Web server software such as ASP .Net from Microsoft, which provides an environment for hosting Web-accessible application software. Those skilled in the art will appreciate that the various embodiments may be adapted to work with other environments for hosting Web-based applications.

The HTTP client 106 may be a software component hosted by an implementation-suitable computing arrangement. The software component may be configured to generate HTTP-forms-processing requests that reference objects in the application object model.

Figure 2:
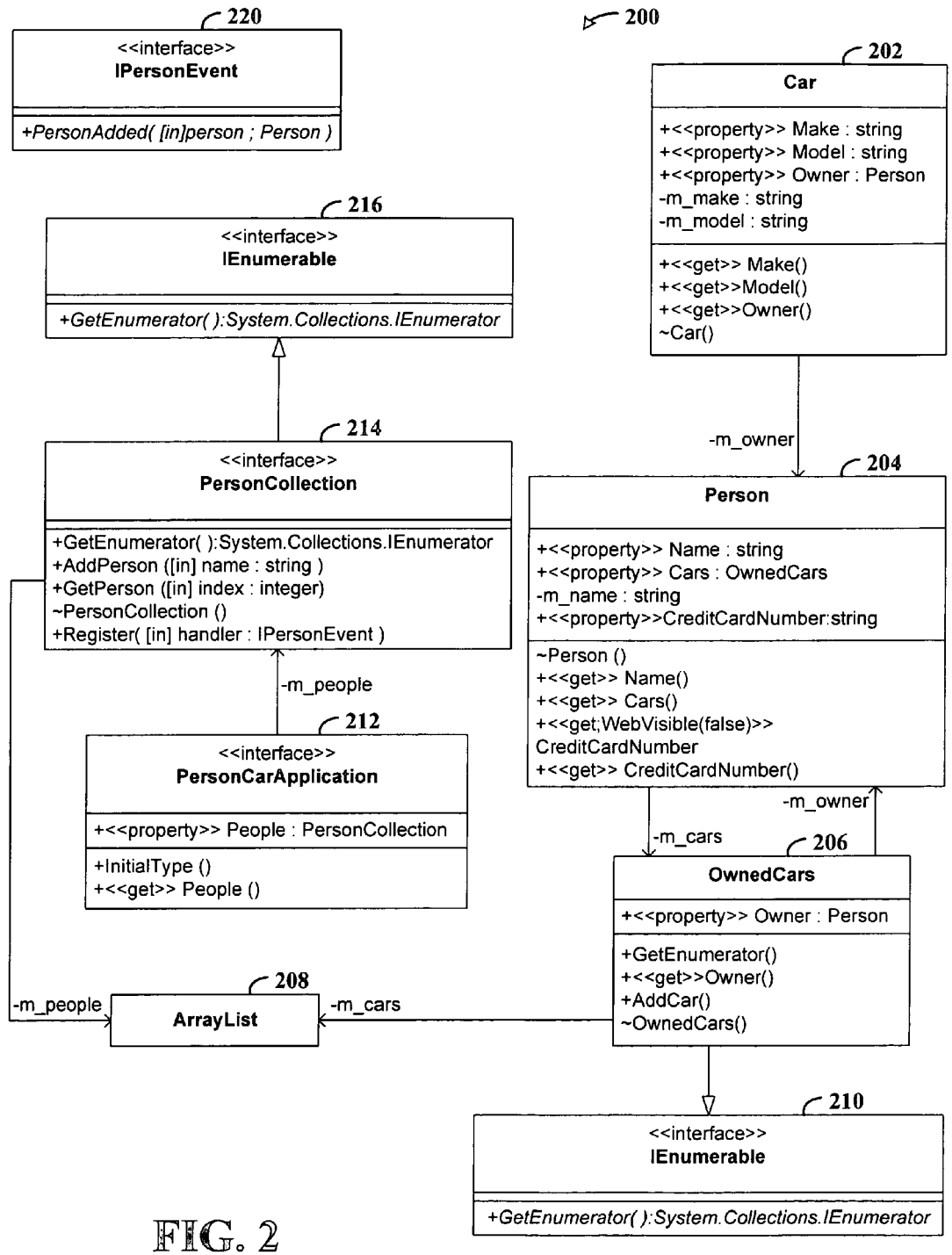
FIG. 2 illustrates an object model that serves as an example in the discussion of exposing an object model in the following figures.

FIG. 2 illustrates an object model that serves as an example in the discussion of exposing an object model in the following figures. The object model 200 models people and the cars they own. Any given person may own one or many cars. The model assumes that an application exists to host the model.

Each Car 202 is owned by a Person 204, and a Person may own a collection of OwnedCars 206. The OwnedCars are maintained by an ArrayList 208. It will be appreciated that IEnumerable is an interface in the .Net framework. A class that implements this interface, for example classes 210 and 216, can be thought of as a collection. Such a class supports iteration through its elements. The various embodiments of the invention treat a class that supports IEnumerable as follows. IEnumerable classes may be considered value types. Example value types include integers, strings, and user-defined structures. When an instance of a class implementing IEnumerable is encountered, a process iterates through the elements of the underlying collection and returns the XML representations of those elements. In implementations using a framework other than the .Net framework, there are interfaces comparable to IEnumerable on which the collection-handling logic may be triggered.

The PersonCarApplication 212 is used as the initial type through which the object model 200 may be navigated, and people in the object model are modeled with PersonCollection 214. The PersonCollection is maintained by an ArrayList 208.

IPersonEvent 220 is an interface that represents the event that is generated when a person is added to the PersonCollection 214. PersonCollection 214 is indirectly related to Person 204 through ArrayList 208. It will be appreciated that ArrayList is a special .Net-specific collection class that implements an "infinitely" expanding array. Similar constructs exist in frameworks other than the .Net framework.

Each of the objects has various attributes and methods, the names of which sufficiently explain the respective meanings.

FIG. 3 illustrates an example of a process 300 for parsing an input HTTP-forms-processing request in accordance with various embodiments of the invention. When the Web object model 110 receives an HTTP-forms-processing request, the request is processed against the application object model and instantiated data objects. A request may be generally used to assign a data value to an attribute of a data object, obtain a value of an attribute, obtain a reference to a data object, invoke a method of an object, or register for event notification.

The parsing process sets a currentObject to the initialObject specified in the Web configuration file 112 (step 302), and a currentPropertyName is set to the next property name from the received HTTP-forms-processing request, for example a URL (step 304). An example of a URL submitted for processing against object model 200 (FIG. 2) is:

http://localhost/PersonCarApplication/People/5/Name

The current object is initially set to PersonCarApplication (FIG. 2, 212), and the next property name People is assigned to currentPropertyName.

Until the currentPropertyName is set to null, the input request is further parsed (step 306). The currentType is set to the type of the currentObject (step 308). For example, the initial current object is of type PersonCarApplication.

If the currentType contains a property with the currentPropertyName (step 310), then the currentObject is set to the object with the currentPropertyName (step 312). For example, the PersonCarApplication includes a People property, which is the currentPropertyName, and the currentObject is set to People. The currentPropertyName is then set to the next property name in the HTTP-forms-processing request (step 320). For example, the currentPropertyName is set to "5" from the example URL.

In one embodiment, selected properties may be designated as being inaccessible to HTTP clients. For example, the Person object 204 includes a CreditCardNumber property. If in an HTTP-forms-processing request seeks the CreditCardNumber and the WebVisible property is set to false, the parse is aborted in setting the currentObject to the property of the currentPropertyName (step 312), and an exception condition is returned to the HTTP client.

Because the current object People does not have a property that matches the currentPropertyName of "5" (step 314), the currentPropertyName is assumed to be the value of an indexer. The property name associated with an indexer is "Item" ("Item" a property from the .Net framework, in which one embodiment is implemented). The indexerValue is set to currentPropertyName (step 316), and the currentObject is set to the object referenced by the indexerValue (step 318). In the example object model 200 and example URL, the People property is of type PersonCollection 214, which includes an ArrayList 208 of people's names. The currentPropertyName is used as an index to the ArrayList to set the currentObject to the object index 5. The currentPropertyName is set to Name, which is the next property name from the URL (step 320). Returning to the top of the loop, the currentType is set to Person, which is the type of the current object (step 308). The Person type contains the currentPropertyName, Name, and the currentObject is set to the property of the currentObject referenced by the currentPropertyName (the value of Name).

When the end of the URL is reached, the GetNextPropertyNameFromURL method returns null, after which a currentObject is in hand. There may be some unprocessed information left on the URL string related to invoking methods.

The process continues by obtaining a description of any method that is to be invoked (step 322). This description includes the method name, parameter types, and parameter values. Parsing of the method description includes any parameter type transformations that occur as part of the "To" functions.

The process checks whether there is a method (step 324), and if so, continues in obtaining the actual method form the currentObject type (steps 326 and 328). ParseMethodDescriptionFromURL uses regular expressions to break apart the URL into the method name and parameter values. This method also finds any "To" functions and applies those functions to the various parameter string values to come up with the parameter types.

The method is then invoked using the parameter values held in the method description (step 330). The currentObject is updated with any return value.

At this point, currentObject holds the value or reference type (in XML format) to be returned to the caller. Example value types include integers, strings, and user-defined structures. Objects of a reference type are returned in XML using a reference-string representation, which is a simplified URI for the referenced object. If the currentObject is null (step 332), then returnValue is set to a null string (step 334). Otherwise (step 336), the returnValue is formatted according to the type of the currentObject (steps 338, 340, 342, 344 and 346). FormatValueType formats an XML string that describes the value of the target object. Likewise, FormatReferenceType, with assistance from the ReferenceManager (see FIG. 4B), formats an XML string that describes the reference value of the target object.

At step 348, "response" is a typical web server object that represents a client response to an HTTP request. The Stream method is assumed to write the string parameter to the output stream that is forwarded back to the client.

FIGS. 4A-G illustrate various processes performed on various types of HTTP-forms-processing requests in accordance with various embodiments of the invention. The process steps are illustrated in association with objects of the Web object model 110 and an application 400 built around an application object model (FIG. 1, 102). Dashed, non-directional lines represent relationships of various process steps to components involved in processing HTTP-forms-processing requests. Solid, non-directional lines between components represent flow of control and data between components. The processes are shown as blocks that are connected by solid, directional lines.

Figure 4A:
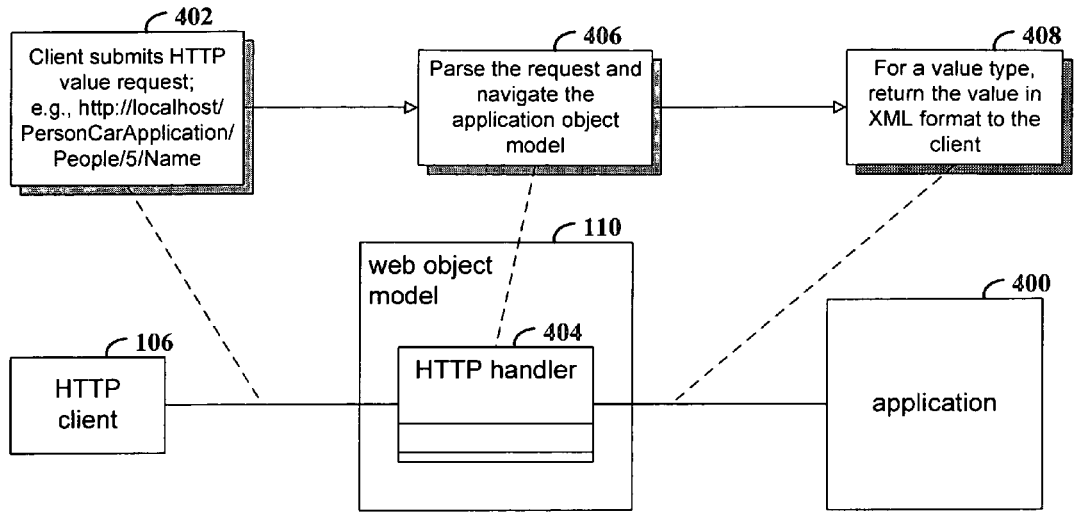
FIG. 4A illustrates an example of a process performed for an HTTP-forms-processing request seeking a value from an application object model.

FIG. 4A illustrates an example of a process performed for an HTTP-forms-processing request seeking a value (e.g., integer, string, or user-defined structure) from an application. The HTTP client 106 submits an HTTP-forms-processing request seeking a value (step 402), for example, the example request described above in association with FIG. 3:

http://localhost/PersonCarApplication/People/5/Name.

The HTTP handler 404 parses the request and traverses the object model as described above in association with FIG. 3 (step 406). For a value type, the HTTP handler encodes the value into XML and returns the encoded value back to the HTTP client (step 408).

Figure 4B:
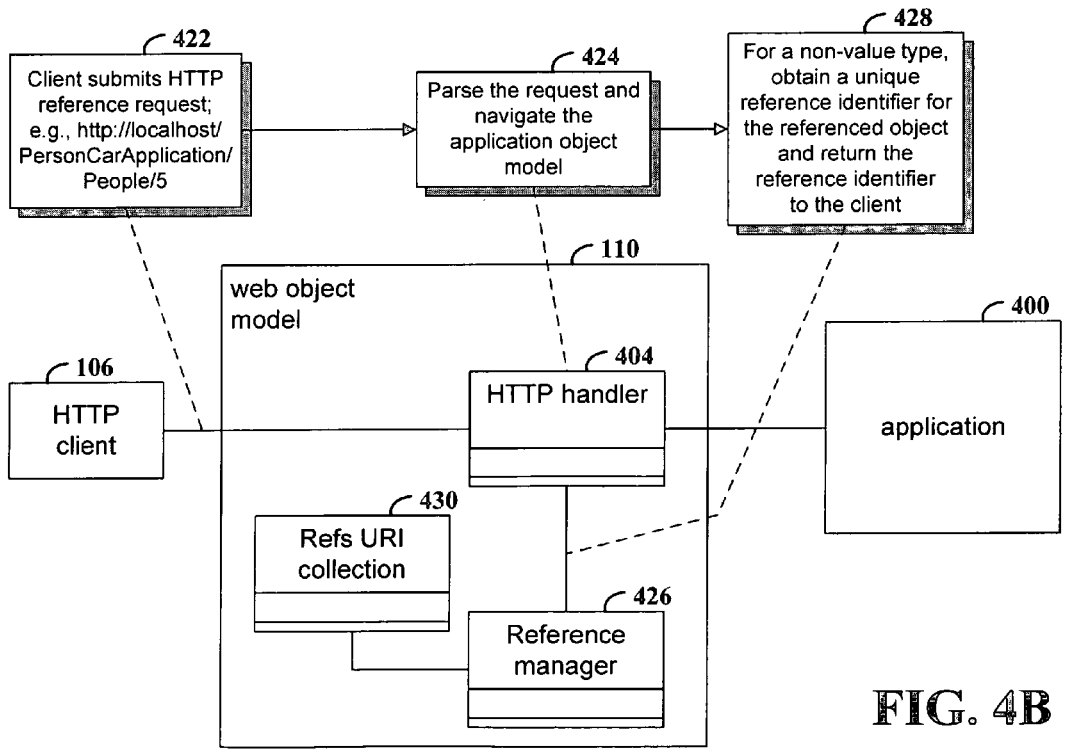
FIG. 4B illustrates an example of a process performed for an HTTP-forms-processing request seeking a reference to an object from an application object model.

FIG. 4B illustrates an example of a process performed for an HTTP-forms-processing request seeking a reference to an object from the application 400. Objects of a reference type are returned in XML using a reference string representation. The HTTP client 106 submits an HTTP-forms-processing request seeking a reference (step 422), for example:

http://localhost/PersonCarApplication/People/5

The HTTP handler 404 parses the request and traverses the object model as described above in association with FIG. 3 (step 424). For a non-value types, the HTTP handler 404 calls on a reference manager 426 to generate a unique reference identifier for the referenced object (step 428). In one embodiment, a globally unique identifier (GUID) is used to represent an object reference. Use of a GUID reduces the chance that someone could randomly guess object references, which may be useful if sensitive data is exposed. The Reference manager 426 registers the unique reference identifier in a Refs URI collection 430 which is accessible to the HTTP client. For example, the returned URI may be:

http://localhost/PersonCarApplication/Refs/DE7994D0-0B09-4aea-B15C-A839281FB388.

The HTTP client may then submit this HTTP request to the HTTP handler on subsequent references to other properties of the object. In parsing the request, the HTTP handler consults the Refs URI collection for a matching identifier and uses an associated pointer to obtain the object. This may reduce the time required to parse a request for an object.

Figure 4C:
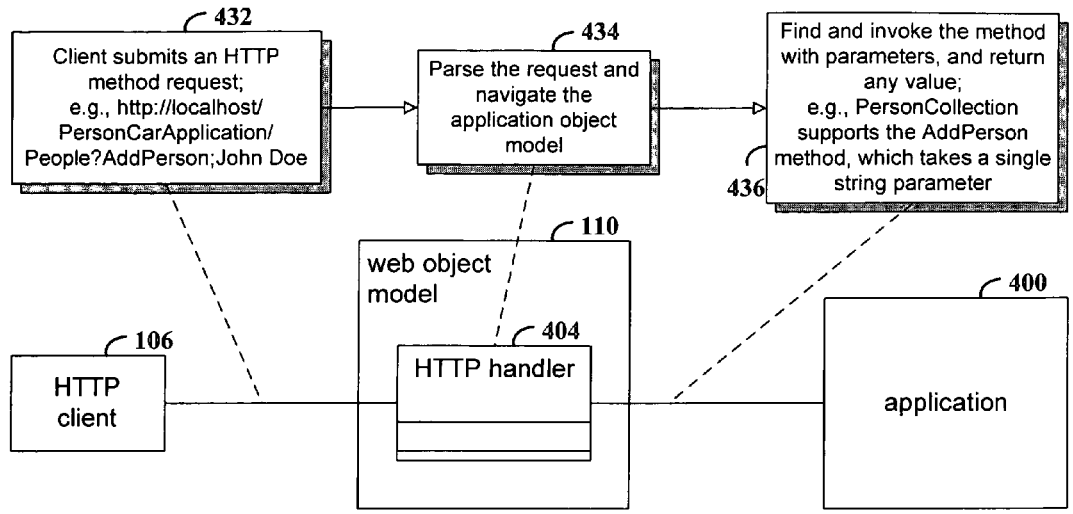
FIG. 4C illustrates an example of a process performed for an HTTP-forms-processing request seeking to invoke a method of an application object model.

FIG. 4C illustrates an example of a process performed for an HTTP-forms-processing request seeking to invoke a method of the application. The HTTP client 106 submits a request that references a method in the application object model. For example, the request may be:

http://PersonCarApplication/People?AddPerson;John Doe

The HTTP handler 404 parses the request and traverses the object model (step 432) to find that AddPerson is method in PersonCollection. The "?" signals that AddPerson is expected to be a method. The method is invoked (step 436) with the parameters specified in the request, for example, the name "John Doe." Parameters to a method are separated by ";" in the request. AddPerson takes a name and creates a Person 204 instance and adds it to the underlying ArrayList 208.

A status value may be returned from an invoked method and then to the HTTP client. In one embodiment, the process of FIG. 3 may be nested within a block that catches exceptions (not shown). Failure of any part of the parsing process due to an exception is handled in the catch block. An exception is a special value type with fields that describe the problem and where it occurred. An exception is formatted in the same manner as a value type and streamed back to the HTTP client.

Figure 4D:
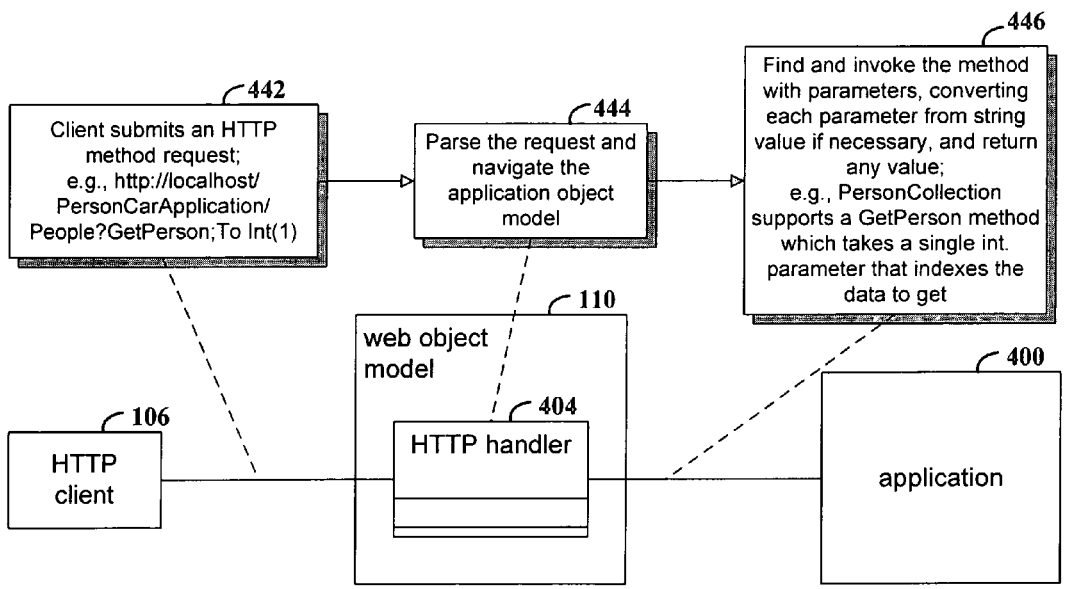
FIG. 4D illustrates an example of a process performed for an HTTP-forms-processing request seeking to invoke a method of an application object model and pass an integer parameter to the method.

FIG. 4D illustrates an example of a process performed for an HTTP-forms-processing request seeking to invoke a method of an application and pass an integer parameter to the method. Because the information in HTTP-forms-processing requests is a character string, any non-string parameters must be converted to the appropriate type before invoking the referenced method. For example, the HTTP client may submit a request (step 442) such as:

http://PersonCarApplication/People?GetPerson;ToInt(1)

The HTTP handler 404 parses the request and finds that GetPerson is a method of PersonCollection (step 444). Because the GetPerson method takes a single integer as a parameter, the HTTP handler converts the character string "1" to an integer before invoking the method (step 446).

It will be appreciated that there are a number of methods such as ToBoolean, ToInt32, ToUint32, etc. in one particular .Net framework class. The regular expression used in the method parsing code picks out these potential conversion methods and the HTTP handler attempts to invoke these methods on the .Net framework class.

Figure 4E:
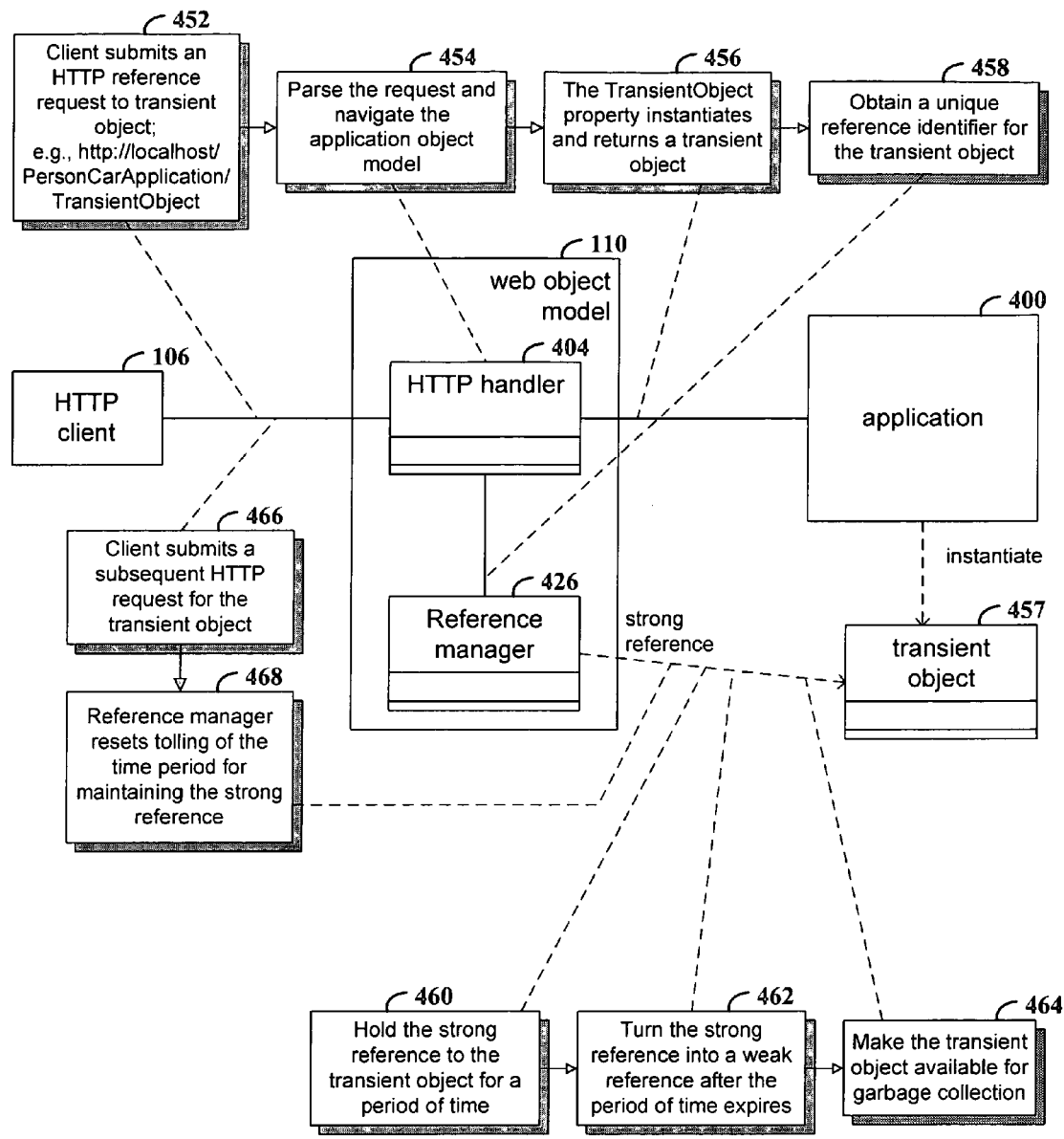
FIG. 4E illustrates an example of a process performed for an HTTP-forms-processing request seeking a reference to a transient object of an application object model.

FIG. 4E illustrates an example of a process performed for an HTTP-forms-processing request seeking a reference to a transient object of an application object model. In one embodiment, the Web object model 110 supports transient and long-lived (non-transient) objects. The lifetime of a transient object depends on client access to the object. That is, a transient object must be accessed, at a minimum, at some regular interval or be subject to being garbage collected. When a transient object is garbage collected, the space allocated to storage of a transient object is freed for other uses. A long-lived object, once created, exists for the lifetime of the underlying application.

When a client seeks instantiation of a transient object, a suitable HTTP request is submitted to the HTTP handler 404 (step 452). And example request is:

http://localhost/PersonCarApplication/ExampleTransientObject

The HTTP handler parses the request and navigates the object model (step 454). The ExampleTransientObject property instantiates a transient object 457 and returns the transient object to the client (step 456). The HTTP handler then causes the Reference manager 426 to create a unique GUID reference identifier for the transient object (step 458). The identifier is also returned to the client for use in subsequent references, and the reference is maintained in the Refs collection as described above.

The Reference manager 426 maintains the reference as a strong reference for a selected period of time (step 460). The selected period of time may be implementation dependent and selected by either the programmer or user. A reference that is a strong reference is not subject to garbage collection. The reference manager changes the strong reference to a weak reference after some period of time has passed (step 462), which makes the transient object available for garbage collection (step 464). The Reference manager handles both transient and long-lived objects in the same manner. Periodically it traverses the list of weak references that it holds and deletes those whose target objects have been garbage collected.

When a client subsequently submits another request for access to the transient object (step 466), the Reference manager 426 resets the tolling of the time period for which the strong reference to the transient object is maintained (step 468). Each access essentially prolongs the lifetime of the transient object.

Figure 4F:
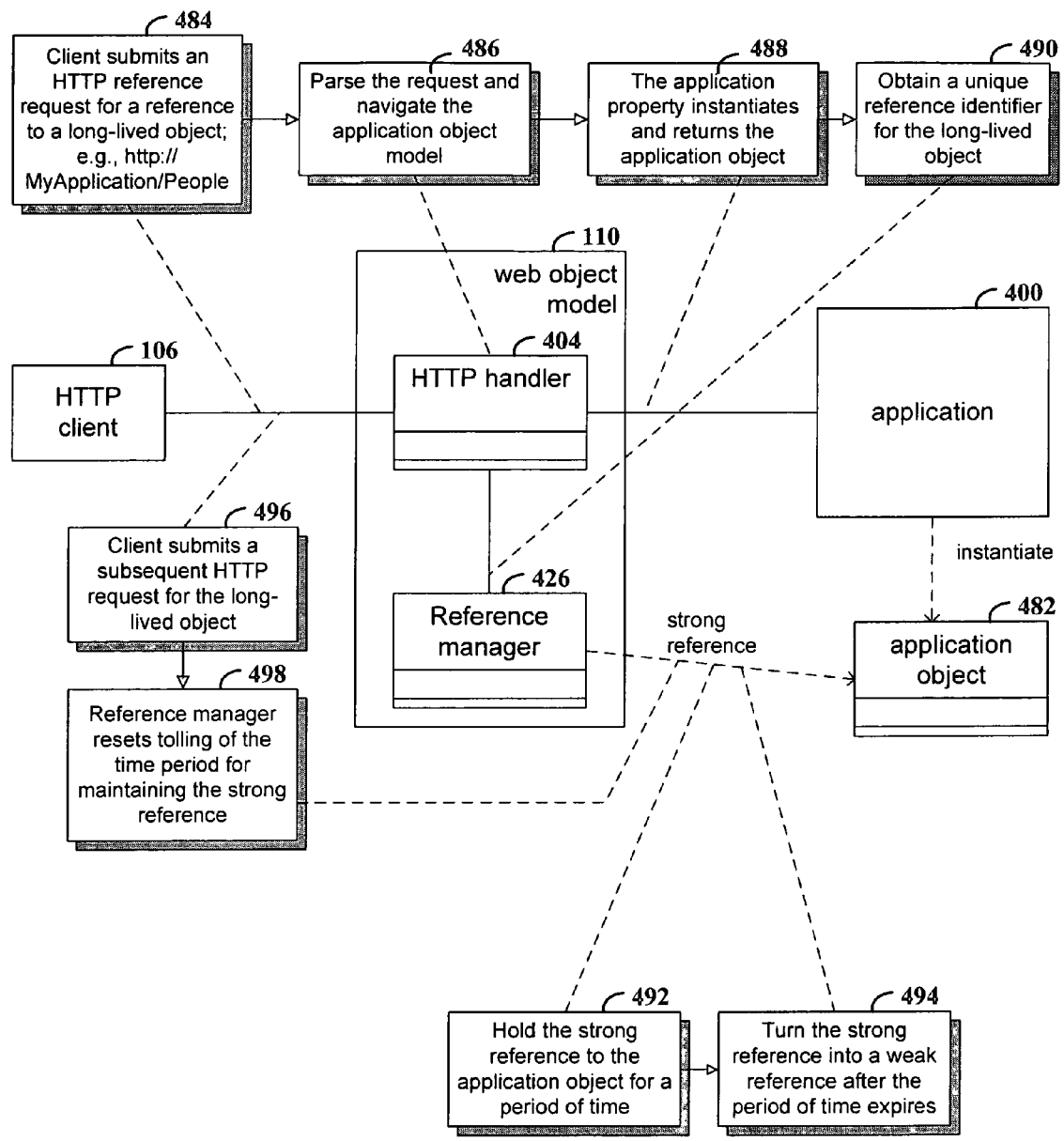
FIG. 4F illustrates an example of a process performed for an HTTP-forms-processing request seeking a reference to a long-lived object of an application object model.

FIG. 4F illustrates an example of a process performed for an HTTP-forms-processing request seeking a reference to a long-lived (a non-transient) object of an application object model. A long-lived object has a lifetime that continues as long as the application is running. That is, the object and associated data are maintained regardless of client access requests to the object, and the object is not subject to garbage collection while the application is active. Long-lived objects are referred to as "application objects" since the lifetime of the object terminates with termination of the application.

When a client seeks instantiation of an application object 482, a suitable HTTP request is submitted to the HTTP handler 404 (step 484). An example request is:

http://localhost/PersonCarApplication/People

The HTTP handler parses the request and navigates the object model (step 486). The People property instantiates an application object 482 and returns the object to the client (step 488). The HTTP handler then causes the Reference manager 426 to create a unique reference identifier for the application object (step 490).

The Reference manager 426 maintains the reference as a strong reference for a selected period of time (step 492). A reference that is a strong reference is not subject to garbage collection. The reference manager changes the strong reference to a weak reference after some period of time has passed (step 494). However, the application object is not subject to garbage collection because it is the duration of the application that controls the lifetime of the object.

When a client subsequently submits another request for access to the application object (step 496), the Reference manager 426 resets the tolling of the time period for which the strong reference to the application object is maintained (step 498). This is performed for ease of implementation even though the application object is not subject to garbage collection even when the strong reference is changed to a weak reference.

Figure 4G:
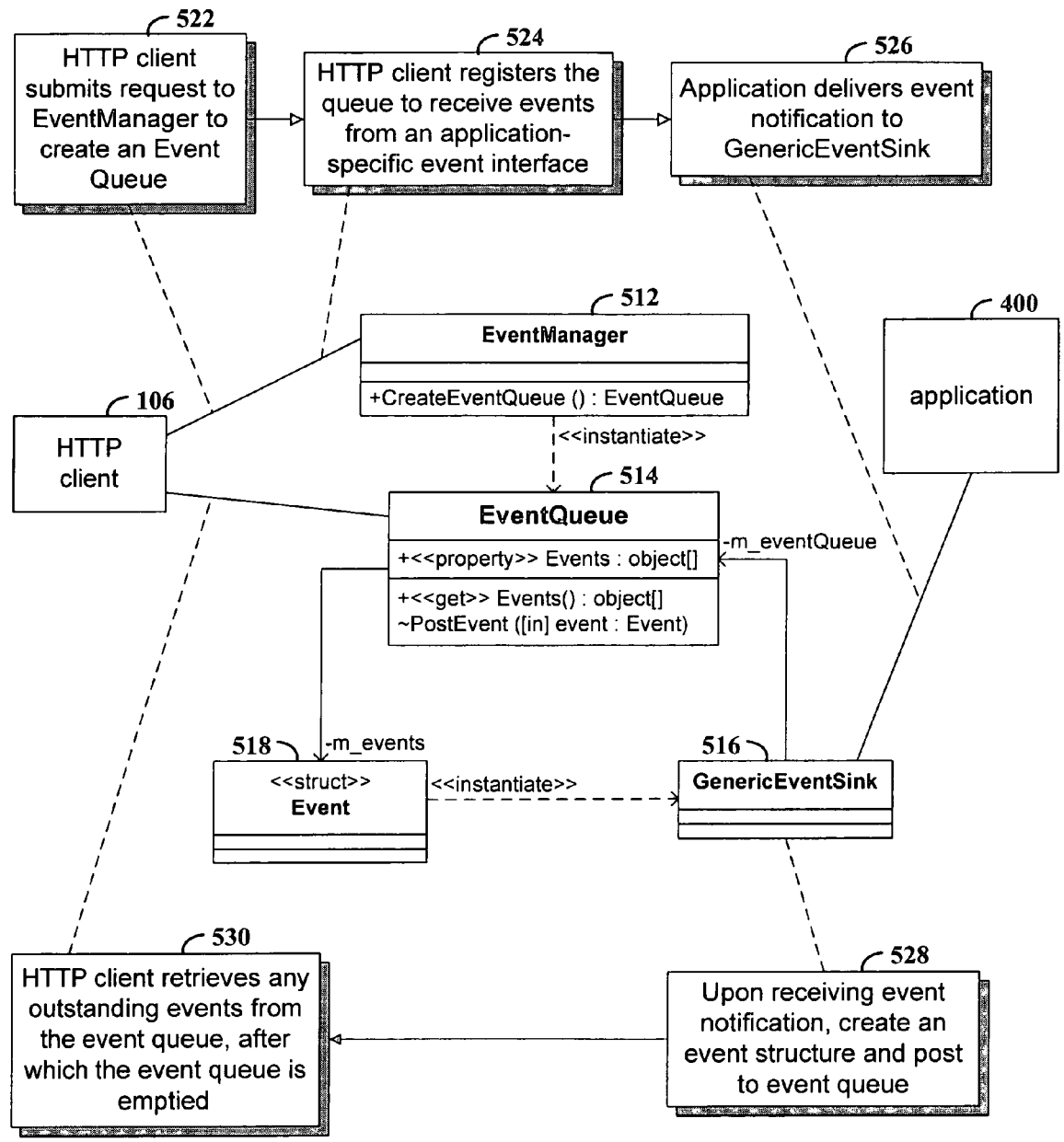
FIG. 4G is an example of a process performed for an HTTP-forms-processing request seeking and accessing an event queue used in combination with an application object model.

FIG. 4G is an example of a process performed for an HTTP-forms-processing request seeking and accessing an event queue used in an application. In one embodiment an event queue may be created at the request of an HTTP client, where the event queue object model may be implemented as part of the application object model 102 (FIG. 1). The event queue object model includes an EventManager 512 with a method for creating an EventQueue 514. An application-generated event is logged in a GenericEventSink 516, which is an instantiation of Event structure 518, and posted in the Event Queue.

Because HTTP is a client-initiated protocol, a server cannot initiate event notifications directly back to a client. The client must poll the server for events. The Web object model 110 exposes the EventManager URI for all applications. The EventManager provides a method by which clients can create an EventQueue to which server events may be delivered.

For an HTTP client to obtain events from the application, it first submits an HTTP-forms processing request to create an event queue (step 522). An example request is:

http://localhost/PersonCarApplication/EventManager?CreateEventQueue

While not shown in this FIG. 4G, it will be appreciated that this request is parsed by the HTTP handler as described previously. The EventManager 512 returns the requested EventQueue object to the HTTP client in response to the request.

An EventQueue 514 is itself a reference type and has a single property called Events that is a value type collection of Event 518 objects. Once polled, the Events in the EventQueue are removed so that subsequent polls provide newly queued events.

Application objects are required to expose events via interfaces. These objects are also assumed to expose a method by which to register these events. A registration method may be invoked (step 524) with an HTTP-forms-processing request such as:

http://localhost/PersonCarApplication/People?Register;ToEvent(IPerson Event, EventQueueReference)

The method takes one parameter. This parameter is an event object created through the ToEvent conversion function, which takes two parameters. The first parameter, IPersonEvent, is the name of the interface that supports the events exposed by the given object. The second parameter, EventQueueReference, is a URI reference to the event queue to which event notifications should be delivered.

From the input arguments a generic event interceptor is formed, for example, GenericEventSink 516, for the specified interface. This interceptor is registered with the application. As the application delivers events to the interceptor (step 526), the interceptor queues event descriptions to the associated EventQueue (step 528). The client may poll the EventQueue by submitting an HTTP GET request with reference to the EventQueue (step 530). The events presently in the EventQueue are XML formatted and returned to the client, and the EventQueue is purged of those events.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for exposing an application object model to web-based clients, comprising:
    parsing each hyper-text transport protocol (HTTP)-form-processing request received from a client by a web server;
    traversing objects in the application object model in response to each property names obtained from the HTTP-form-processing request;
    wherein traversing includes comparing a property name from the request to a property name of an object defined in the application object model;
    for a reference-type property of an object found in traversing the application object model, generating a unique identifier for the reference-type property, registering the unique identifier for the reference-type property in a collection, and returning a Uniform Resource Identifier (URI) that includes the unique identifier to the client;
    maintaining each identifier in the collection according to a lifetime type associated with each identifier, wherein a short-lifetime type reference is controlled by client access to the short-lifetime type reference, and a long-lifetime type reference is controlled by an application object; and
    returning to the client a value of a selected property of an object in the application object model in response to traversal of the application object model.

2. The method of claim 1, further comprising initiating execution of a method of an object in response to a method name obtained from an HTTP-form-processing request.

3. The method of claim 1, further comprising:
    creating an event queue in response to a first keyword obtained from an HTTP-form-processing request;
    registering, in response to a second keyword obtained from an HTTP-form-processing request, with the application objects to receive events generated by the application objects;
    entering the events in the event queue; and
    returning events in the event queue to the client in response to a third keyword obtained from an HTTP-form-processing request.

4. The method of claim 1, further comprising aborting parsing of an HTTP-form-processing request in response to an annotated property associated with a property name obtained from the HTTP-form-processing request.

5. The method of claim 1, further comprising converting a character string parameter in an HTTP-form-processing request to a value having a data type compatible with a property of a property name obtained from the HTTP-form-processing request and setting the property of the object to the value.

6. The method of claim 1, wherein the URI is a globally unique identifier (GUID).

7. The method of claim 1, further comprising removing a short-lifetime type reference from the collection if a client does not submit an HTTP-forms-processing request containing the URI for a selected period of time.

8. The method of claim 7, further comprising maintaining long-lifetime type reference in the collection until a referenced application object is removed.

9. The method of claim 1, further comprising:
    configuring the web server arrangement with an initial object name associated with a name of an application object model; and
    retrieving an object definition of the initial object name in response to the name of the application object model obtained from an HTTP-form-processing request.

10. A computing arrangement for exposing objects to web-based clients, comprising:
    a web server arrangement that includes a data processing system configured with a web server;
    an application object model hosted by the web server, the application object model containing the objects to be exposed;
    a web objects model hosted by the web server, the web objects model configured to parse each hyper-text transport protocol (HTTP)-form-processing request received from a client by a web server, traverse objects in the application object model in response to property names obtained from the HTTP-form-processing request, wherein traversing includes comparing a property name from the request to a property name of an object defined in the application object model, generate, for a reference-type property of an object found in traversing the application object model, a unique identifier for the reference-type property, registering the unique identifier for the reference-type property in a collection, and return a Uniform Resource Identifier (URI) that includes the unique identifier to the client, maintain each identifier in the collection according to a lifetime type associated with each identifier, wherein a short-lifetime type reference is controlled by client access to the short-lifetime type reference, and a long-lifetime type reference is controlled by an application object, and return to the client a selected property of an object in the application object model in response to traversal of the application object model.

11. The arrangement of claim 10, wherein the web objects model is further configured to initiate execution of a method of an object in response to a method name obtained from an HTTP-form-processing request.

12. The arrangement of claim 10, wherein the web objects model is further configured to initiate a method to create an event queue in response to a first keyword obtained from an HTTP-form-processing request, and initiate a method to register, in response to a second keyword obtained from an HTTP-form-processing request, with the application objects to receive events generated by the application objects, and return events in the event queue to the client in response to a third keyword obtained from an HTTP-form-processing request.

13. The arrangement of claim 10, wherein the web objects model is further configured to abort parsing of an HTTP-form-processing request in response to an annotated property associated with a property name obtained from the HTTP-form-processing request.

14. The arrangement of claim 10, wherein the web objects model is further configured to convert a character string parameter in an HTTP-form-processing request to a value having a data type compatible with a property of a property name obtained from the HTTP-form-processing request and set the property of the object to the value.

15. The arrangement of claim 10, wherein the URI is a globally unique identifier (GUID).

16. The arrangement of claim 10, wherein the web objects model is further configured to remove a short-lifetime type reference from the collection if a client does not submit an HTTP-forms-processing request containing the URI for a selected period of time.

17. The arrangement of claim 16, wherein the web objects model is further configured to maintain long-lifetime type reference in the collection until a referenced application object is removed.

18. The arrangement of claim 10, further comprising:
an initial object name associated with a name of an application object model in the web server; and
wherein the web objects model is further configured to retrieve an object definition of the initial object name in response to the name of the application object model obtained from an HTTP-form-processing request.

19. An apparatus for exposing an application object model to web-based clients, comprising:
one or more data processing systems;
means for parsing each hyper-text transport protocol (HTTP)-form-processing request received from a client by a web server process hosted on the one or more data processing systems;
means for traversing objects in the application object model in response to property names obtained from the HTTP-form-processing request and for comparing a property name from the request to a property name of an object defined in the application object model as part of the traversing; and
means for generating, for a reference-type property of an object found in traversing the application object model, a unique identifier for the reference-type property, registering the unique identifier for the reference-type property in a collection, and for returning a Uniform Resource Identifier (URI) that includes the unique identifier to the client;
means for maintaining each identifier in the collection according to a lifetime type associated with each identifier, wherein a short-lifetime type reference is controlled by client access to the short-lifetime type reference, and a long-lifetime type reference is controlled by an application object; and
means for returning to the client a selected property of an object in the application object model in response to traversal of the application object model.

20. The apparatus of claim 19, further comprising:
means for creating an event queue in response to a first keyword obtained from an HTTP-form-processing request;
means for registering, in response to a second keyword obtained from an HTTP-form-processing request, with the application objects to receive events generated by the application objects; and
means for returning events in the event queue to the client in response to a third keyword obtained from an HTTP-form-processing request.

* * * * *